US006851290B1

(12) United States Patent
Meier et al.

(10) Patent No.: US 6,851,290 B1
(45) Date of Patent: Feb. 8, 2005

(54) DOOR LOCK ASSEMBLY AND LOCKING SYSTEM FOR HINGED DOUBLE-ACTING IMPACT-TRAFFIC DOORS

(75) Inventors: Terry E. Meier, Christmas, FL (US); John D. Wild, Orlando, FL (US)

(73) Assignee: Absolute Access & Security Products, Inc., Orlando, FL (US)

( * ) Notice: Subject to any disclaimer, the term of this patent is extended or adjusted under 35 U.S.C. 154(b) by 0 days.

(21) Appl. No.: 10/638,463

(22) Filed: Aug. 11, 2003

(51) Int. Cl.[7] .......................... B60R 25/04; E05B 15/02; E05B 17/00

(52) U.S. Cl. .............................. 70/257; 70/461; 70/466; 292/340; 292/341; 292/341.18; 292/349.19; 292/DIG. 55; 292/DIG. 60

(58) Field of Search ........................ 70/257, 277, 278.1, 70/461, 466; 292/340, 341, 341.13, 341.18, 341.19, DIG. 39, DIG. 40, DIG. 55, DIG. 60

(56) References Cited

U.S. PATENT DOCUMENTS 1,706,102 A * 3/1929 Booth ........................ 292/60
2,352,437 A * 6/1944 Howard ....................... 292/87
2,612,399 A * 9/1952 Mastrangelo ............... 292/340
3,385,624 A * 5/1968 Baclini ................. 292/341.18
3,552,791 A * 1/1971 Watermann ................. 292/340
3,697,106 A * 10/1972 Meyer ....................... 292/175
3,826,526 A * 7/1974 Wepsala, Jr. ................ 292/346
3,851,325 A * 11/1974 Maged ....................... 340/542
3,863,965 A * 2/1975 Vickers ....................... 292/66
4,022,504 A * 5/1977 Anderson .................. 292/340
4,084,347 A 4/1978 Brown
4,209,194 A * 6/1980 Poe ....................... 292/341.18
4,227,386 A 10/1980 Crockett
RE31,276 E * 6/1983 Schlage ...................... 292/340
4,402,159 A 9/1983 Domagalski
4,453,752 A * 6/1984 McKann ................ 292/341.19
4,492,397 A * 1/1985 Allenbaugh ............ 292/341.18
4,719,774 A 1/1988 Newman et al.
5,120,248 A * 6/1992 Daleiden et al. .............. 440/77
5,246,258 A 9/1993 Kerschenbaum et al.
5,352,001 A 10/1994 Shieh
5,459,972 A 10/1995 Eckel
5,832,756 A 11/1998 Herman et al.
6,259,352 B1 7/2001 Yulkowski et al.
6,347,486 B1 * 2/2002 Badillet ....................... 49/394
6,351,977 B1 * 3/2002 Pedroso et al. ............... 70/257
6,454,324 B1 * 9/2002 Lewis et al. ........... 292/341.16
8,481,253 11/2002 Fan
6,550,826 B2 4/2003 Fukushima et al.
6,557,913 B1 * 5/2003 Kunst ......................... 292/340
6,564,600 B1 * 5/2003 Davis .......................... 70/277
6,698,263 B2 * 3/2004 Hsieh .......................... 70/257

* cited by examiner

*Primary Examiner*—Suzanne Dino Barrett

(57) ABSTRACT

A lock assembly and locking systems adapted for use with hinged bidirectional hardened plastic doors is provided. The lock assembly comprises a moveable bolt arranged within a housing and a having a first perimeter; a strikeplate spaced apart from the housing and having a hole with a second perimeter; and an actuator adapted to move the bolt form an unlocked position where the bolt is within the housing to a locked position where a portion of the bolt extends into the hole, wherein the second perimeter is 2–10 times greater than the first perimeter such that the hinged double-acting impact-traffic door has an amount of play when the bolt is in the locked position.

20 Claims, 3 Drawing Sheets

DOOR LOCK ASSEMBLY AND LOCKING SYSTEM FOR HINGED DOUBLE-ACTING IMPACT-TRAFFIC DOORS

FIELD OF THE INVENTION

The present invention relates in general to the field of lock assemblies and locking systems and, in particular, to lock assemblies and locking systems adapted for use with hinged double-acting impact-traffic doors.

BACKGROUND OF THE INVENTION

Hinged double-acting impact-traffic doors serve as a popular threshold for areas that receive heavy impact bearing traffic. These doors are commonly found in retail stores at the interface between the public sales area and the restricted stockroom area, and accommodate traffic such as forklifts, dollies and carts. These doors are also commonly found at the threshold of mailrooms and further accommodate bidirectional mail cart traffic, as well as in and around shipping, loading and receiving areas and warehouses. One reason for the popularity of these doors is that they can withstand forces imparted by impact bearing traffic much better than wood or metal doors. Impact-traffic doors distort and absorb the impact of the momentum force, whereas wood and metal doors crack and break. These doors may also include detachable plastic bumpers to further protect the doors from impact, may be arranged as double doors to provide a wider threshold, and may include windows.

A problem exists, however, in suitably securing this type of door. Since the flexible impact-traffic door distorts easily over time due to continual impact, it rarely aligns in the exact same position when closed. For example, it may close on one side of the doorframe one time and then close one the other side of the doorframe the next time. For another example, the bottom of the door may become bent or warped by continued full-mail cart impact such that the bottom of the door usually closes on one side of the doorframe while the top of the door usually closes on the other side of the doorframe. This alignment problem is exasperated by the double-acting nature of the door. Since there is no doorstop on the doorframe, there is no structure for the door to lay up against. Additional detractors such as insulation strips placed along the door or doorframe periphery, further contribute to this alignment problem.

Thus, to secure these hinged double-acting impact-traffic doors, a person must manually and painstakingly align the lock bolt with the strikeplate hole so that they can mate prior to locking the door. This requisite time and patience is particularly problematic within the fast-paced environment in which the doors function. Moreover, even when locked, portions of the flexible door can be bent twelve inches or more, thereby allowing ingress or egress to unintended materials or persons notwithstanding the locked door.

There is thus a need for an improved lock assembly and locking system for hinged double-acting impact-traffic doors.

SUMMARY OF THE INVENTION

The present invention provides an improved lock assembly and locking system for hinged double-acting impact-traffic doors. The present invention also provides for automated secured ingress and egress system through hinged double-acting impact-traffic doors.

One aspect of the invention provides a lock assembly adapted for use with a hinged double-acting impact-traffic door comprising a moveable bolt arranged within a housing and a having a first perimeter; a strikeplate spaced apart from the housing and having a hole with a second perimeter; and an actuator adapted to move the bolt from an unlocked position where the bolt is within the housing to a locked position where a portion of the bolt extends into the hole, wherein the second perimeter is 2–10 times greater than the first perimeter such that the hinged double-acting impact-traffic door has an amount of play when the bolt is in the locked position.

Another aspect of the present invention provides a lock assembly adapted for use with a hinged double-acting impact-traffic door comprising a moveable bolt arranged within a housing and a having a first radial length and a second radial length; a strikeplate spaced apart from the housing and having a hole with a first radial length and a second radial length, the first or second radial length of the hole being 2–10 times greater than the first or second radial length of the bolt; and an actuator adapted to move the bolt from an unlocked position where the bolt is within the housing to a locked position where a portion of the bolt extends into the hole, wherein when the bolt is in the locked position the hinged double-acting impact-traffic door can be pushed or pulled at least 0.5 inch without the bolt exterior contacting the hole interior.

Another aspect of the invention provides a locking system adapted to lock and unlock a hinged double-acting impact-traffic door comprising a lock assembly comprising a lock portion with a moveable bolt having a first perimeter and a strikeplate portion with a hole having a second perimeter; a controller adapted to direct the locking and unlocking of the hinged double-acting impact-traffic door; a bolt position sensor adapted to provide an electronic signal to the controller indicative of the position of the bolt; and an actuator electronically interconnected to the controller adapted to move the bolt as directed by the controller, wherein when the door is locked, the door can be moved at least 1 inch without being bent.

BRIEF DESCRIPTION OF THE DRAWINGS

The above-mentioned and other concepts of the present invention will now be addressed with reference to the drawings of the preferred embodiments of the present invention. The illustrated embodiments are intended to illustrate, but not to limit the invention. The drawings contain the following figures, in which like numbers refer to like parts throughout the description and drawings and wherein.

DETAILED DESCRIPTION OF THE PREFERRED EMBODIMENTS

Figure 1:
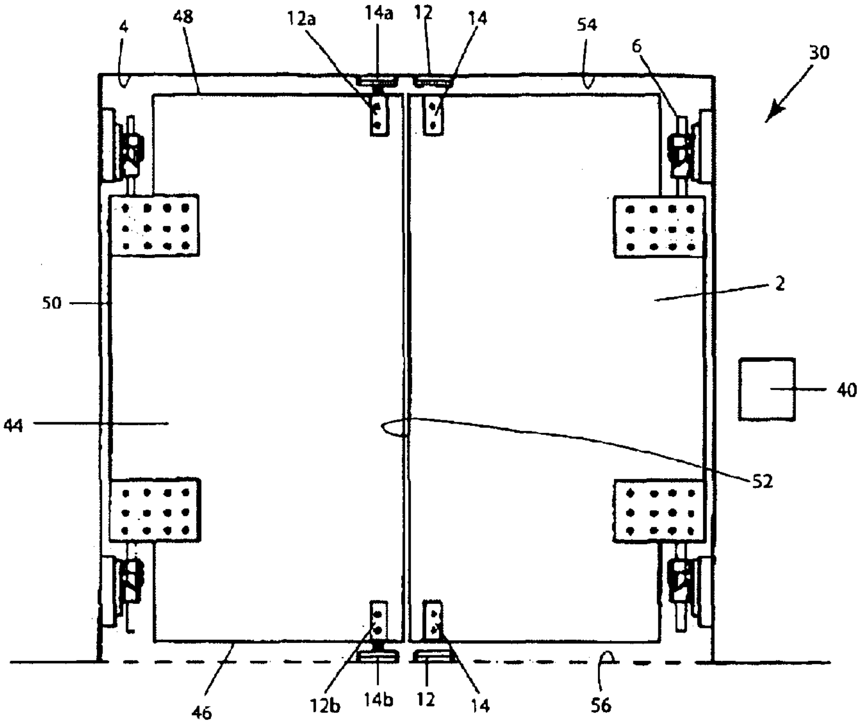
FIG. 1 is a front elevation view of the exterior of a door using the door locking system of the present invention.

The invention described herein employs several basic individual or collective concepts. For example, one concept relates to a lock assembly comprising a lock bolt cooperatively sized and configured to fit within a strikeplate recess while affording an appreciable amount of play or tolerance. Another concept relates to automated secured ingress and egress for hinged double-acting impact-traffic doors.

The present invention is disclosed in context of use with a hinged double-acting impact-traffic door. The principles of the present invention, however, are not limited to hinged double-acting impact-traffic doors, and those skilled in the art may find additional applications for the apparatus, processes, systems, components, configurations, methods and applications disclosed herein. For example, the lock assembly and locking system can be used with other types of flexible doors. For another example, the lock assembly and locking system can be used with doors that tend not to align in the exact same position when in the closed position, such as old or warped doors, doors with sagging hinges, doors with frame damage, unframed or partially framed doors. Thus, the illustration and description of the present invention in context of a lock apparatus and locking system for hinged double-acting impact-traffic doors is merely one possible application of the present invention. However, the present invention has been found particularly suitable in connection with hinged double-acting impact-traffic doors.

With reference to FIGS. 1–4, a general overview of the components and operation of the lock assembly 10 and locking system 30 of the present invention is provided, followed by a more detailed description of the components and operation. The lock assembly 10 advantageously comprises a lock portion 12 and a strikeplate portion 14, the lock portion 12 having a housing 16 that houses a moveable bolt 18 actuated by an actuating force 20 such as a solenoid. A strikeplate 22 having a recess or thruhole 24 is disposed apart from the housing 16 such that the bolt 18 can move from a position within or substantially within the housing 16 (i.e. the unlocked position of FIG. 1) to a position where a portion of the bolt 18 extends into the hole 24 of the strikeplate 22 (i.e. the locked position of FIG. 2).

The locking system 30 is particularly adapted to lock a double-acting impact-traffic door 2 attached to a doorframe 4 by at least one hinge 6, where the lock housing 16 of the lock assembly 10 is attached to the door 2, and the strikeplate 22 of the lock assembly 10 is attached to the doorframe 4 (or vice-versa). The locking system 30 advantageously comprises a plurality of electronically interconnected components arranged on the interior side of the door 2, such as an exit button 32, motion detector 34, power supply 36, controller 38, bolt position sensor 39 and the like. Similarly, at least one electronically interconnected component is advantageously arranged on the exterior side of the door 2, such as an ID card reader 40, motion detector, timer, and the like.

Figure 2:
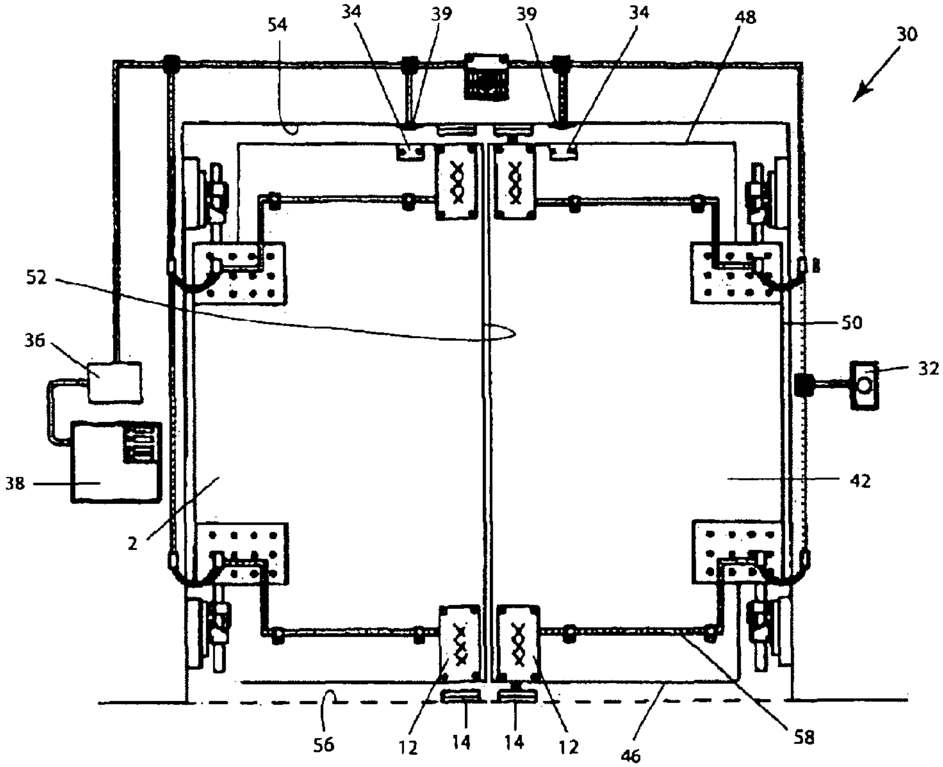
FIG. 2 is a front elevation view of the interior of the door using the door locking system of FIG. 1.

Referring now to FIGS. 1 and 2, the illustrated door 2 is embodied as a conventional full size commercial threshold partition. This exemplary partition has a front facing 42 located within the interior of a building, a rear facing located at the exterior of the building 44, a lower side 46 near the floor or ground, an upper side 48 near the ceiling or sky, a hinged side 50 near the hinge 6, and an unhinged side 52 farther away from the hinge 6, which collectively form a generally rectangular three dimensional structure. Of course, the door 2 need not be formed as a conventional full size commercial partition, need not include any of the above-identified sections, and need not form a rectangular or other geometric structure. The door 2 is advantageously constructed of one or more suitably strong impact resistant, hard, flexible or impact absorbing material, laminate or composite layers or sections, such as plastic, foam, sheet metal, vinyl, rubber, combinations thereof and the like, although other materials may also be used to achieve the purposes of the present invention. As understood by those skilled in the art, the term double-acting means the door 2 can swing bidirectionally such that it can be both pushed and pulled from either the front facing 42 or the rear facing 44. These doors are commercially available from sources such as the Chase Doors company under the tradenames Duralite®, Proline™, Chase™, and AirGard®, the RubbAir Door company under the tradenames Standard™, Poly-Kor™, Ultra-Lite™, Elite™, SlenDor™, TL™, and Flap-R Door™, the Eliason corporation under the nomenclatures PMP, HCP, HCG, SCP, SCG, FCG, FMP, FCD, LWP, and the like. These doors also have been described in patents such as U.S. Pat. Nos. 5,459,972, 4,402,159 and 4,084,347.

The lock assembly 10 may be directly or indirectly attached to any portion(s) or area(s) of the door 2. Thus, although the illustrated embodiment shows a first lock portion 12*a* arranged toward the upper unhinged side 48, 52 of the door 2 to cooperate with a first strikeplate portion 14*a* arranged on a top portion 54 of the doorframe 6, and a second lock portion 12*b* arranged toward the lower unhinged side 46, 52 of the door 2 to cooperate with a second strikeplate portion 14*b* arranged on the floor, other configurations could be used such as along one or more portions of the unhinged side 52 of the door 2, along one or more sections of the top portion 54 of the doorframe 6 between the hinged and unhinged sides 50, 52 of the door 2, along one or more sections of the bottom portion 56 of the doorframe 6 between the hinged and unhinged sides 50, 52 of the door 2. However, it has been found advantageous to arrange at least two lock assemblies 10 as illustrated to provide a door 2 secured near the four corners i.e. by hinges 6 arranged toward the upper and lower 46, 48 hinged sides 50 of the door 2, and by the lock assemblies 10 arranged toward the upper and lower 46, 48 unhinged sides 52 of the door 2, thereby reducing the distance between secured locations and thus reducing the ability of an intruder to forcibly bend the door 2 a significant amount and thereby gain unauthorized entry or access.

Figure 3:
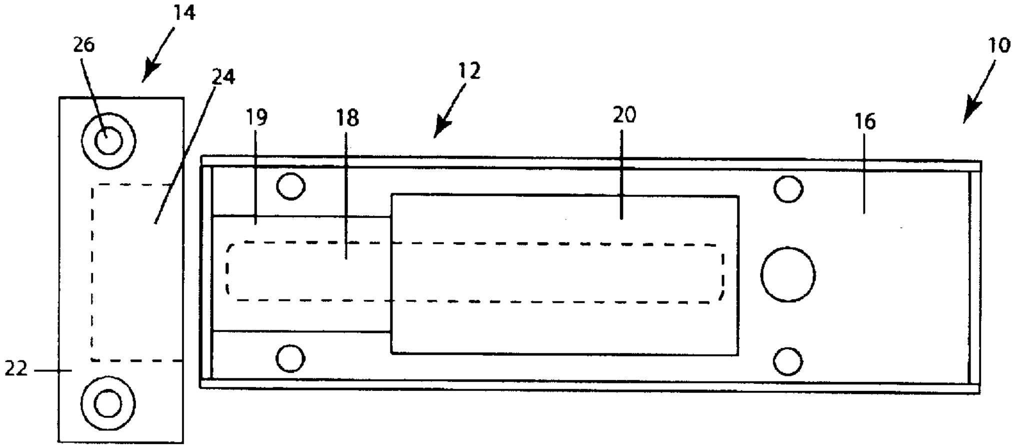
FIG. 3 is a side elevation view of the lock assembly of the present invention, showing the lock assembly in an unlocked position.
Figure 4:
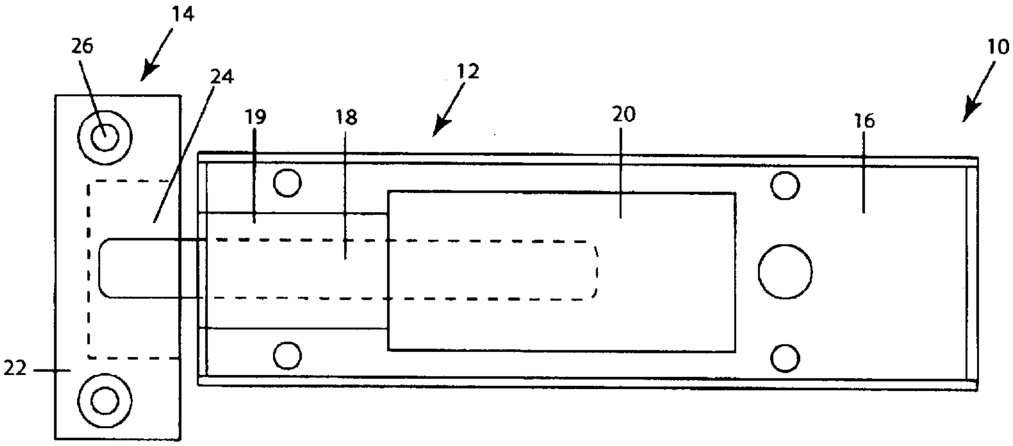
FIG. 4 is a side elevation view of the lock assembly of the present invention, showing the lock assembly in a locked position.

Referring now to FIGS. 3 and 4, the lock assembly 10 advantageously comprises a lock portion 12 and a strikeplate portion 14. The lock portion 12 comprises a housing 16, moveable bolt 18 and actuator 20, and the strikeplate portion 14 comprises a strikeplate 22 with recess or hole 24.

The lock portion 12 provides mating interaction with the strikeplate portion 14. The housing 16 houses at least a portion of the bolt 18 and actuator 20. A passageway 19 is formed within the housing and sized and configured to allow bolt 18 movement between the actuator 20 and hole 24. The illustrated bolt 18 has a generally cylindrical configuration with a length suitable to mate with the hole 24 and a diameter of about 0.5 inch, although many other sizes and geometries could be used as explained in more detail below, and may be made of any suitably strong material such as metal, plastic, resin, wood, composites, combinations thereof and the like, for example, ferromagnetic metal, stainless steel, aluminum, magnesium alloys, brass, ABS plastic and the like. The bolt 18 advantageously has a rest or home position adjacent or near the actuator 20. The bolt 18 can reside in this home position by any of a variety of configurations as will be understood by those skilled in the art, such as spring loading, gravity, inertia, magnetic force, pneumatics, friction, proximity switches and the like. The actuator 20 provides a biasing force capable of urging the bolt 18 from the home position, along the passageway 19, and toward the hole 24 in the strikeplate 22. The actuator 20 may be embodied in any of a variety of configurations as will be understood by those skilled in the art, such as a solenoid, piston, spring, pneumatic, hydraulic, worm gear, gear driven motor, manually and the like. The actuator 20 may provide a one-way biasing force (i.e. capable of urging the bolt 18 only from the home position toward the strikeplate 19) or may provide a two-way biasing force (i.e. capable of urging the bolt 18 from the home position toward the strikeplate 22 and also from strikeplate 22 back to the home position). The bolt 18 is operatively connected to the actuator 20 such that the actuator 20 can urge or impart movement to the bolt 18. For example, if the actuator 20 is configured as a solenoid and the bolt 18 is made of a ferrous metal, when an electric current is passed through the solenoid, the magnetically active solenoid urges the metallic bolt 18 away from its home position near the solenoid 20 and toward the strikeplate 22. Conversely, when the electric current is not passed through the solenoid and thus the solenoid is magnetically inactive, the bolt 18 is not urged toward the strikeplate 22 and remains in the home position near the solenoid. Suitable lock portions 12 are commercially available, such as those manufactured by the Security Door Controls company as model number 180 and those manufactured by the Dyna Lock, Locknetics, Rofu, Precision Hardware, Rutherford Controls companies and the like.

The strikeplate portion 14 has a thickness, length and width suitable to perform its security and attachment function, depending on the desired strength of the lock assembly 10 and materials from which it 14 is made. The strikeplate 22 may be made of any suitably strong material such as metal, plastic, resin, wood, composites, combinations thereof and the like, for example, aluminum or hardened steel. As illustrated, the recess 24 formed in the strikeplate 22 extends entirely through the strikeplate 22 to form a hole having a cylindrical configuration with a diameter of about 2 inches adapted to cooperate with and accept the bolt 18, although many other sizes and geometries could be used as explained in more detail below. However, the recess 24 need not extend entirely through the strikeplate 22 to form a hole. One or more apertures 26 are formed through the strikeplate 22 to accept one or more screws or bolts and secure the strikeplate 22 to the doorframe 4 or other suitable securing structure, although other means or mechanisms could be used to secure the strikeplate 22 to the doorframe 4 such as adhesives and the like.

Still referring to FIGS. 3 and 4, in an exemplary operation, to lock the door, the solenoid 20 is magnetically activated, thereby urging the bolt 18 from the home position, along the passageway 19, and toward the strikeplate 22. As the bolt 18 approaches the strikeplate 22, it enters the hole 24 in the strikeplate 22 to provide the door in the locked position. To unlock the door, the electric current is removed from the solenoid 20, thereby magnetically deactivating the solenoid 20 and allowing the bolt 18 to return to the home position to provide the door in the unlocked position.

Figure 5:
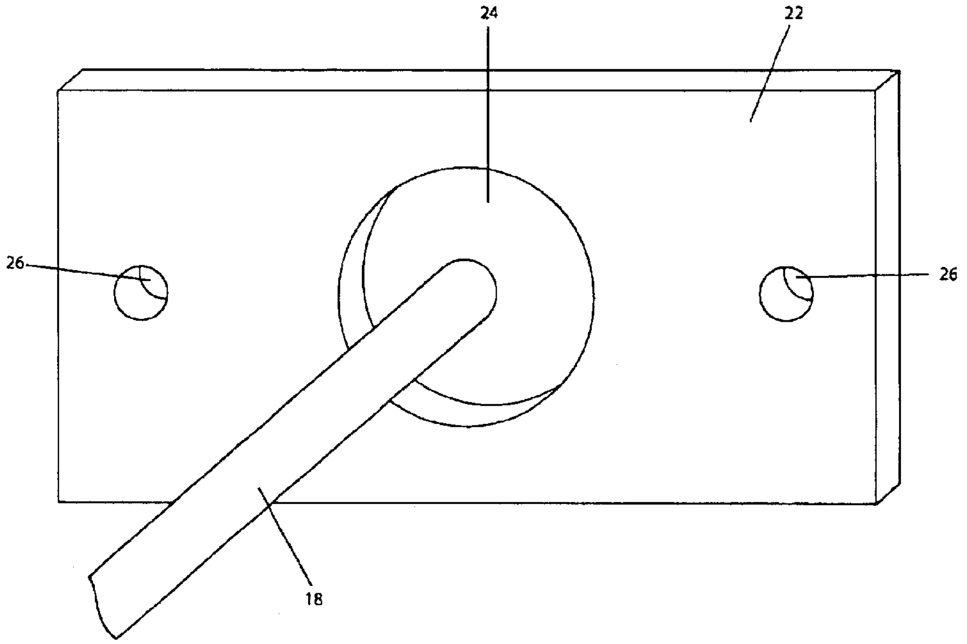
FIG. 5 is a detail perspective view of the bolt and strikeplate of the lock assembly present invention.

Referring now to FIG. 5, the bolt 18 and hole 24 are cooperatively sized and configured such that which the bolt 18 extends into the hole 24 an appreciable amount of play or tolerance exists between the bolt 18 and hole 24. That is, for example in the context of use of the illustrated embodiment, the hole 24 may have a diameter of 2 inches and the bolt 18 may have a diameter of only 0.5 inch. Due to this loose-fit configuration, the bolt 18 need not be closely aligned with the hole 24 prior to locking the door, but rather, the bolt 18 need only be roughly aligned with the hole 24, as the much larger sized hole 24 allows for appreciable uncertainty in the location of the bolt 18 when the bolt 18 is to be advanced into the hole 22.

The particular cooperating dimensions of the bolt 18 and hole 24 can vary greatly depending on the context of use, location along the door, and the amount of desired security. For example, if used to secure an oversized door the tolerance could be larger, and if used to secure an undersized door or window the tolerance could be smaller. Similarly, for example, if the bolt 18 and strikeplate 22 are arranged such that they mate near the unhinged side 52 of the door 2 as illustrated, the tolerance could be larger to accommodate increased location uncertainty due to the increased hinge-to-bolt distance, and if arranged such that they mate near the hinged side 50 of the door 2, the tolerance could be smaller since the smaller hinge-to-bolt distance affords greater likelihood of successful bolt 18 and hole 24 mating. Further, if a higher amount of security is desired such that minimal door 2 movement is required when the door is in the locked position, a smaller tolerance could be used. Also, more than one tolerance could be used with more than one lock assembly 10 on a single door 2.

Thus, in the exemplary illustrated context of use where two lock assemblies 10 are arranged toward the unhinged side 52 of a conventional sized double-acting impact-traffic door 2, the diameter of each bolt 18 is preferably about 0.1–2 inches and more preferably about 0.5–1 inch, and the diameter of each hole 24 is preferably about 0.5–5 inches, more preferably about 1–3 inches. By this configuration, when the door 2 is in the locked position, the door 2 can still be moved about 0.2–3 inches in either direction, preferably about 0.5–2 inches in either direction, before contact is made between the exterior of the bolt 18 and the interior of the hole 24 and thereby requiring the door 2 to be forcibly bent in order to be further opened. Alternatively stated, in the exemplary illustrated context of use, the diameter of each hole 24 is preferably about 2–10 times greater than the diameter of each cooperating bolt 18, more preferably about 3–5 times greater.

Figure 6:
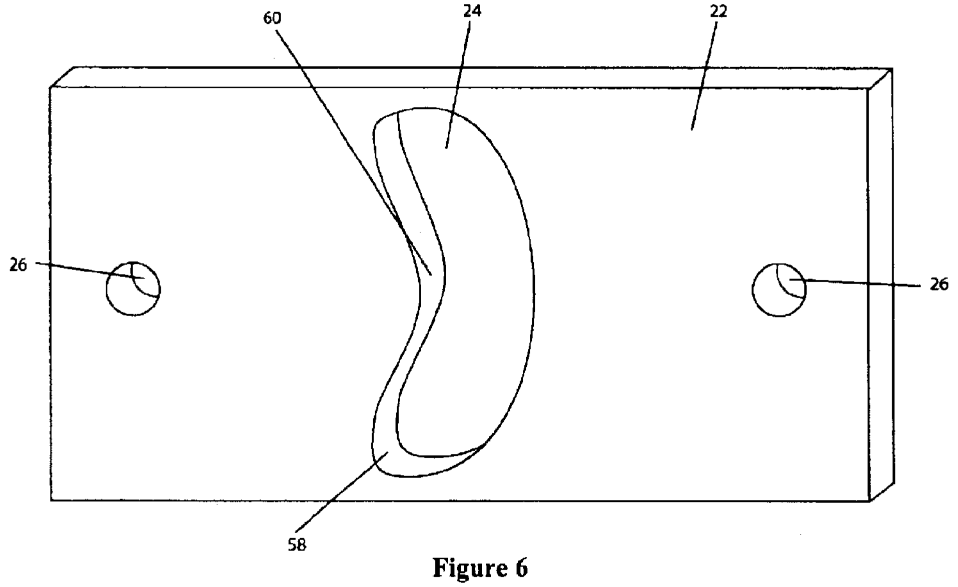
FIG. 6 is a perspective view of another embodiment of the strikeplate of the present invention.

Referring to FIG. 6, the hole 24 in the strikeplate 22 need not have a circular cross-section, but rather can have any cross-sectional geometry. For example, a gentle crescent shape configured to generally follow the arc of the door 2 may be used. This shape is advantageous if the door 2 tends to close on either side of the doorframe 4, since the bolt 18 location will then more likely tend to align somewhere along the crescent shaped hole 24. The hole 24 may have other cross-sectional geometries 24, such as oval, square, triangular, rectangular, pentagonal, octagonal, polygonal, curved, curvilinear and the like, while providing the play or tolerance between the exterior perimeter of the bolt 18 and the interior perimeter of the hole 24. The bolt 18 may have a similar geometry as the hole 24, with the hole 24 perimeter advantageously about 2–10 times greater than the bolt 18 perimeter, but may also have a different geometry. For example, the hole 24 could have a gentle crescent shape while the bolt 18 has a circular or square shape for increased strength. More broadly, when viewed in cross-section, the hole 24 may be characterized as having peaks 58 and valleys 60, with the peaks 58 forming an extended or first radial length as measured from the peak 58 to the geometrical center of the hole 24, and the valleys 60 forming a reduced or second radial length as measured from the valley 60 to the geometrical center of the hole 24. Similarly, the bolt 24 may be characterized as having peaks and valleys that form extended or first and second or reduced radial lengths. Thus, for example, the hole 24 may have either an extended or reduced radial length that is 2–10 times greater than either the extended or reduced radial length of the bolt 18. Of course, the first radial length could be the same length as the second radial length if there are no peaks or valleys (i.e. circular cross-section). Also, the peaks 58 need not be of the same size, and thus a plurality of extended radial lengths may be formed on the hole 24 or bolt 18; similarly, the valleys 60 need not be of the same size, and thus a plurality of reduced radial lengths may be formed on the hole 24 or bolt 18.

A liner may be arranged along the interior perimeter of the hole 24 to impart additional strength or wear resistance to the strikeplate 22. Also, the hole 24, bolt 18 or both may have a chamfer or beveled edge to help guide the bolt 18 into the hole 22.

A plurality of strikeplates 22 may be stacked together to vary the total thickness of the layered strikeplates 22 and enable it 22 to more easily adjust and fit into the spatial surroundings of the door 2 and doorframe 4. By this modular strikeplate 22 design, the space between the lock portion 12 and the strikeplate portion 14 need not present a significant obstacle during installation of the lock assembly 10. If stacked strikeplates 22 are used, the modular strikeplate 22 should include a hole instead of a recess 24 so that the bolt 18 can extend through the stacked strikeplates 22, although the strikeplate 22 adjacent the doorframe 4 may still have a recess 24 rather than a hole.

Referring back to FIGS. 1 and 2, the locking system 12 comprises a plurality of electronically interconnected components adapted to allow authorized users an easy, if not automated, and controlled access through the door 2. The locking system 30 advantageously comprises a plurality of electronically interconnected components arranged on an interior side of the door 2, such as one or more an exit buttons 32, motion detectors 34, power supplies 36, control consoles 38, bolt position sensors 39 and the like. Similarly, at least one electronically interconnected component is advantageously arranged on an exterior side of the door 2, such as an ID card reader 40. However, the interior and exterior sides need not include any of these components in particular.

By this configuration and with these exemplary components, one or more motion detectors 34 or timers could be used to allow the door 2 to remain in a default locked position, but automatically unlock based on certain approach motion or time amount. For example, if a mail cart or other impact bearing traffic is pushed or otherwise moving toward the door 2, a motion detector 34 can detect this approach and inform the controller 38 within a control console which can then send an electronic signal via armored cable 58 to the bolt position sensor 39 to verify that the bolt 18 is not within the hole 24 and thus that the door 2 is in the unlocked position. If the bolt position sensor 39 indicates that the door 2 is in the locked position, an electronic signal is sent from the controller 38 directing that the solenoid 20 be magnetically deactivated, thereby allowing the bolt 18 to return to the home position and the door 2 to become unlocked. Alternatively, the controller 38 may automatically direct the solenoid 20 to be uncharged upon indication from the motion detector 34 of incoming traffic. After the mail cart proceeds through the door 2, another motion detector or a timer can trigger the controller 38 to send an electronic signal that causes the door 2 to become locked. Conversely, one or more motion detectors or timers could be used in a similar manner to allow the door to remain in a default unlocked position, but automatically lock based on certain motion or during certain times.

Many other automated ingress and egress configurations are possible. For example, instead of or in additional to motion detectors, remote control receivers and transponders could be used such that a person need only activate the remote control to unlock or lock the door 2. For another example, a keypad, exit button, or ID card reader 40 could be used to provide selective ingress or egress, instead of or in addition to the motion detectors or remote controls.

Although this invention has been described in terms of certain exemplary uses, preferred embodiments and possible modifications thereto, other uses, embodiments, and possible modifications apparent to those of ordinary skill in the art are also within the spirit and scope of this invention. It is also understood that various aspects of one or more features of this invention can be used or interchanged with various aspects of one or more other features on this invention. Accordingly, the scope of this invention is intended to be defined only by the claims that follow.

What is claimed is:

1. A lock assembly, comprising:

a moveable bolt arranged within a housing and a having a first cross-sectional length;

a strikeplate spaced apart from the housing and having a hole with a second length; and an actuator adapted to move the bolt from an unlocked position where the bolt is within the housing to a locked position where a portion of the bolt extends into the hole, wherein the second length is 3–10 times greater than the first length such that the difference between the second length and the first length provides for an amount of play between the bolt and the strikeplate when the bolt is in the locked position.

2. The lock assembly of claim 1, wherein the first cross sectional length is a major length about 0.1–2 inches.

3. The lock assembly of claim 2, wherein the bolt has a diameter of about 0.5–1 inch.

4. The lock assembly of claim 1, wherein the bolt is arranged substantially within the housing.

5. The lock assembly of claim 1, wherein the hole has a diameter second length is a major length about 0.5–5 inches.

6. The lock assembly of claim 1, wherein the hole has a diameter of about 1–3 inches.

7. The lock assembly of claim 6, wherein the bolt has a diameter of about 0.5 inch and the strikeplate has a diameter of about 2 inches.

8. The lock assembly of claim 1, amount of play is generally horizontal to a floor.

9. The lock assembly of claim 1, wherein a plurality of strikeplates are stacked to increase the depth of the hole.

10. The lock assembly of claim 1, wherein when the bolt is in the locked position the amount of play that a door has is at least 1 inch when pushed or pulled.

11. A lock assembly adapted for use with a hinged double-acting impact-traffic door, comprising:

a moveable bolt arranged within a housing and a having a first radial length and a second radial length;

a strikeplate spaced apart from the housing and having a hole with a first radial length and a second radial length, the first or second radial length of the hole being 2–10 times greater than the first or second radial length of the bolt; and an actuator adapted to move the bolt from an unlocked position where the bolt is within the housing to a locked position where a portion of the bolt extends into the hole, wherein when the bolt is in the locked position the hinged double-acting impact-traffic door can be pushed or pulled at least 0.5 inch without the bolt exterior contacting the hole interior.

12. The lock assembly of claim 11, wherein when the bolt is in the locked position the door can be push or pulled up to 6 inches without being bent.

13. The lock assembly of claim 12, wherein when the bolt is in the locked position the door can be pushed or pulled up to 4 inches without being bent.

14. A locking system adapted to lock and unlock a hinged double-acting impact-traffic door, comprising:

a lock assembly comprising a lock portion with a moveable bolt having a first perimeter and a strikeplate portion with a hole having a second perimeter, the second perimeter being greater than the first perimeter;

a controller adapted to direct the locking and unlocking of the hinged double-acting impact-traffic door;

a bolt position sensor adapted to provide an electronic signal to the controller indicative of the position of the bolt; and an actuator electronically interconnected to the controller adapted to move the bolt as directed by the controller, wherein when the door is locked, the bolt is advanced into the hole and the door can be moved at least 1 inch without being bent.

15. The lock assembly of claim 14, wherein the second perimeter is 2–10 times greater than the first perimeter such that the hinged double-acting impact-traffic door has an amount of play when the bolt is in the locked position.

16. The lock assembly of claim 14, wherein the second perimeter is a diameter of about 2 inches and the first perimeter is a diameter of about 0.5 inch.

17. The lock assembly of claim 14, wherein the actuator is a solenoid.

18. The lock assembly of claim 14, wherein the controller is located within a control console near the door.

19. The lock assembly of claim 14, wherein the controller is electronically interconnected to a plurality of components selected from the group consisting of: exit button, motion detector, remote control receiver, power supply, and ID card reader.

20. The lock assembly of claim 19, wherein the door serves as a partition between an interior and exterior of a building, and an exit button, motion detector or remote control receiver is located within the interior of the building near the door.

* * * * *